US011906121B1

(12) United States Patent
Cunnien et al.

(10) Patent No.: US 11,906,121 B1
(45) Date of Patent: Feb. 20, 2024

(54) LASER HIGH BEAM AND LOW BEAM HEADLAMP APPARATUS AND METHOD

(71) Applicant: KYOCERA SLD Laser, Inc., Goleta, CA (US)

(72) Inventors: Cole J. Cunnien, Goleta, CA (US); Eric Goutain, Fremont, CA (US); Sten Heikman, Goleta, CA (US); James W. Raring, Santa Barbara, CA (US)

(73) Assignee: KYOCERA SLD Laser, Inc., Goleta, CA (US)

( * ) Notice: Subject to any disclaimer, the term of this patent is extended or adjusted under 35 U.S.C. 154(b) by 0 days.

(21) Appl. No.: 17/971,466

(22) Filed: Oct. 21, 2022

(51) Int. Cl.
*F21S 41/16* (2018.01)
*F21S 41/176* (2018.01)
*F21S 41/40* (2018.01)
*F21S 41/33* (2018.01)
*F21S 41/20* (2018.01)

(52) U.S. Cl.
CPC ............. *F21S 41/16* (2018.01); *F21S 41/176* (2018.01); *F21S 41/285* (2018.01); *F21S 41/33* (2018.01); *F21S 41/40* (2018.01)

(58) Field of Classification Search
CPC .......... F21S 41/16; F21S 41/33; F21S 41/176; F21S 41/40; F21S 41/285
See application file for complete search history.

(56) References Cited

U.S. PATENT DOCUMENTS

| | | | |
|---|---|---|---|
| 6,125,225 | A | 9/2000 | Dianov et al. |
| 6,142,650 | A | 11/2000 | Brown et al. |
| 6,791,103 | B2 | 9/2004 | Nakamura et al. |
| 9,318,875 | B1 | 4/2016 | Goutain |
| 10,222,474 | B1 | 3/2019 | Raring et al. |
| 10,670,224 | B1 | 6/2020 | Lin et al. |
| 10,718,491 | B1 | 7/2020 | Raring et al. |
| 11,125,415 | B2 | 9/2021 | Raring et al. |
| 11,757,250 | B2 | 9/2023 | Raring et al. |
| 2004/0212350 | A1 | 10/2004 | Patino et al. |
| 2009/0128717 | A1 | 5/2009 | Nagashima et al. |
| 2010/0280322 | A1 | 11/2010 | Mizuyoshi |
| 2011/0134947 | A1 | 6/2011 | Rahum et al. |
| 2015/0229107 | A1 | 8/2015 | McLaurin et al. |
| 2016/0286616 | A1 | 9/2016 | van de Ven |
| 2017/0051884 | A1 | 2/2017 | Raring et al. |
| 2018/0323581 | A1 | 11/2018 | Stojetz et al. |
| 2019/0107389 | A1 | 4/2019 | Ahmed |
| 2021/0194206 | A1 | 6/2021 | Raring et al. |
| 2022/0042672 | A1 | 2/2022 | Raring et al. |

FOREIGN PATENT DOCUMENTS

| | | |
|---|---|---|
| JP | 2012-256535 A | 12/2012 |

OTHER PUBLICATIONS

Extended European Search Report for Application No. 20841104.1-1212, dated Aug. 3, 2023, 12 pages.

(Continued)

*Primary Examiner* — Matthew J. Peerce
(74) *Attorney, Agent, or Firm* — Kilpatrick Townsend & Stockton LLP

(57) ABSTRACT

The present techniques include a plurality of laser lamp modules. In an example, the plurality of laser lamp modules includes a high beam wide lamp module, a high beam narrow lamp module, a low beam cut lamp module, and a low beam wide lamp module, each of which has a blue laser, and is sealed from an outside environment for reliability.

18 Claims, 17 Drawing Sheets

(56) References Cited

OTHER PUBLICATIONS

U.S. Appl. No. 16/512,903, Notice of Allowance dated Mar. 26, 2020, 11 pages.
U.S. Appl. No. 16/923,476, Notice of Allowance dated May 17, 2021, 11 pages.
U.S. Appl. No. 16/725,410 Non-Final Office Action dated Dec. 22, 2022, 14 pages.

FIGURE 5 Headlamp Low Beam
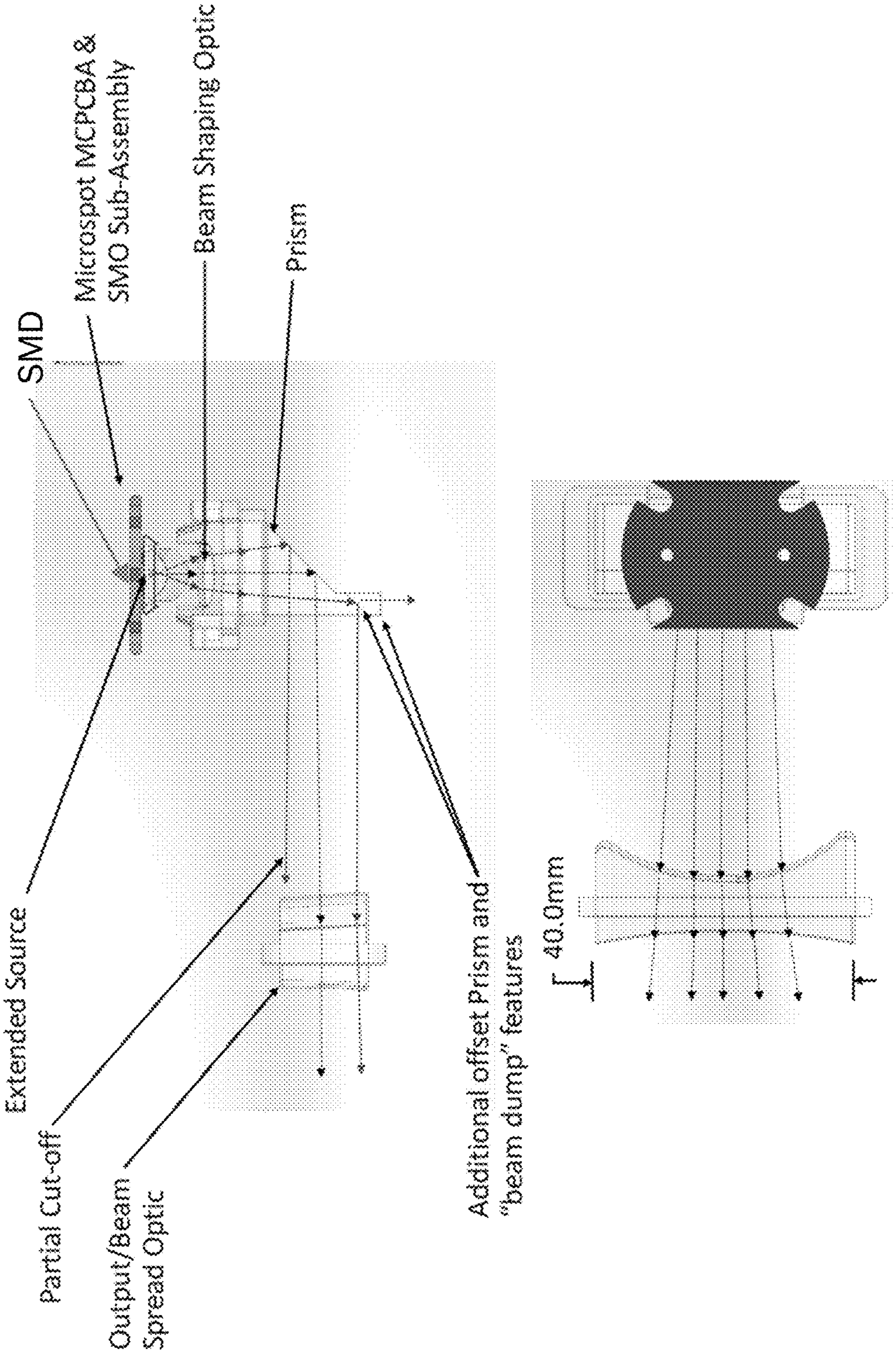

FIGURE 6 Headlamp HB Light Rays
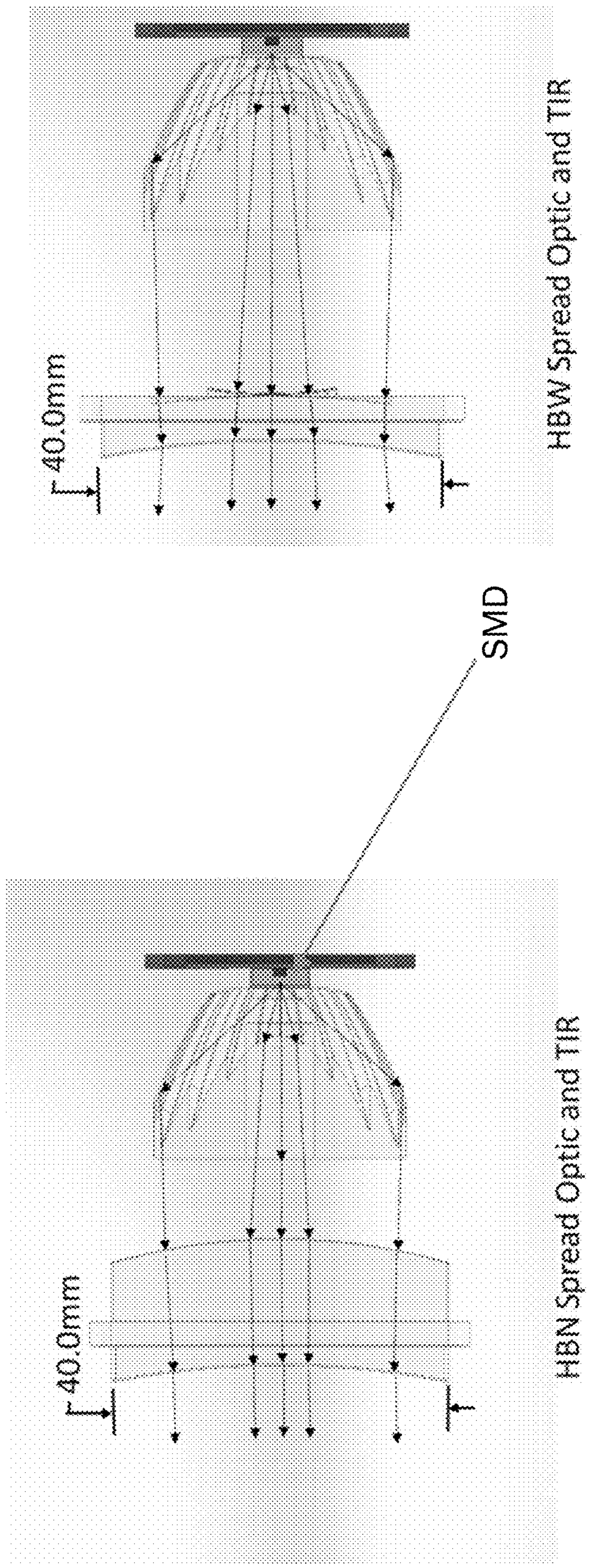

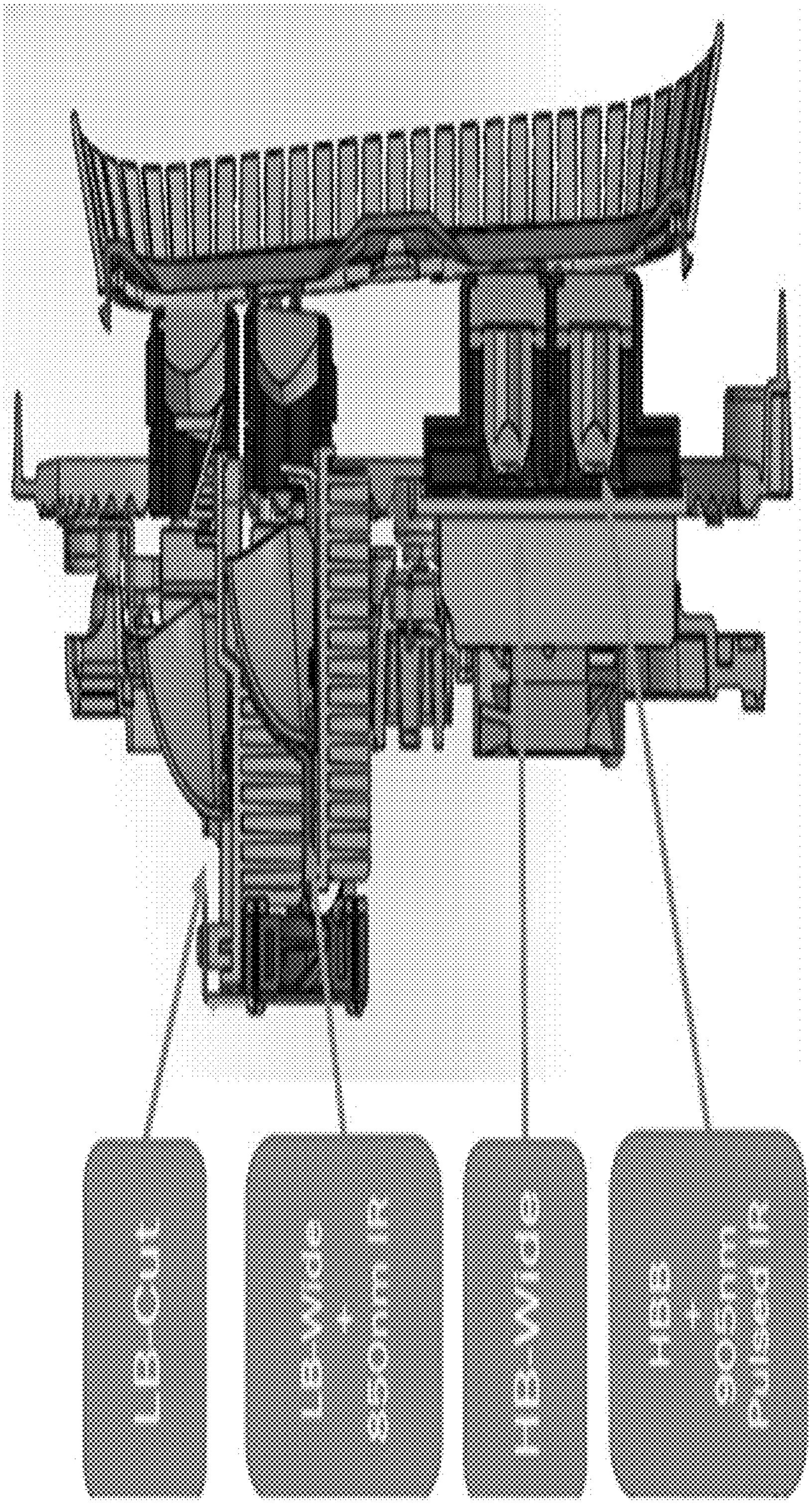
FIGURE 7 Headlamp Design 25mm x 65mm lens

FIGURE 8 Headlamp Design 25mm x 65mm lens
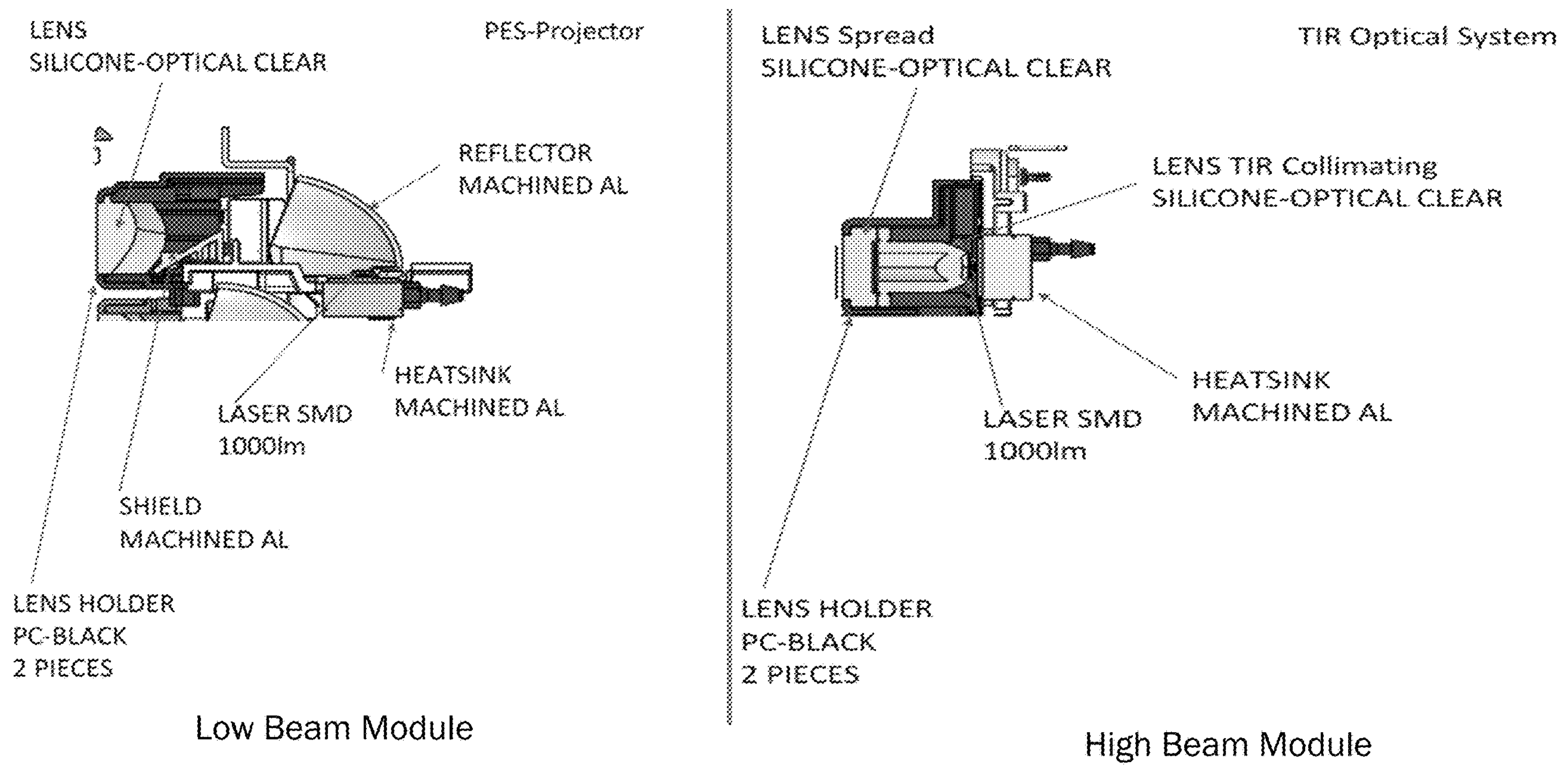

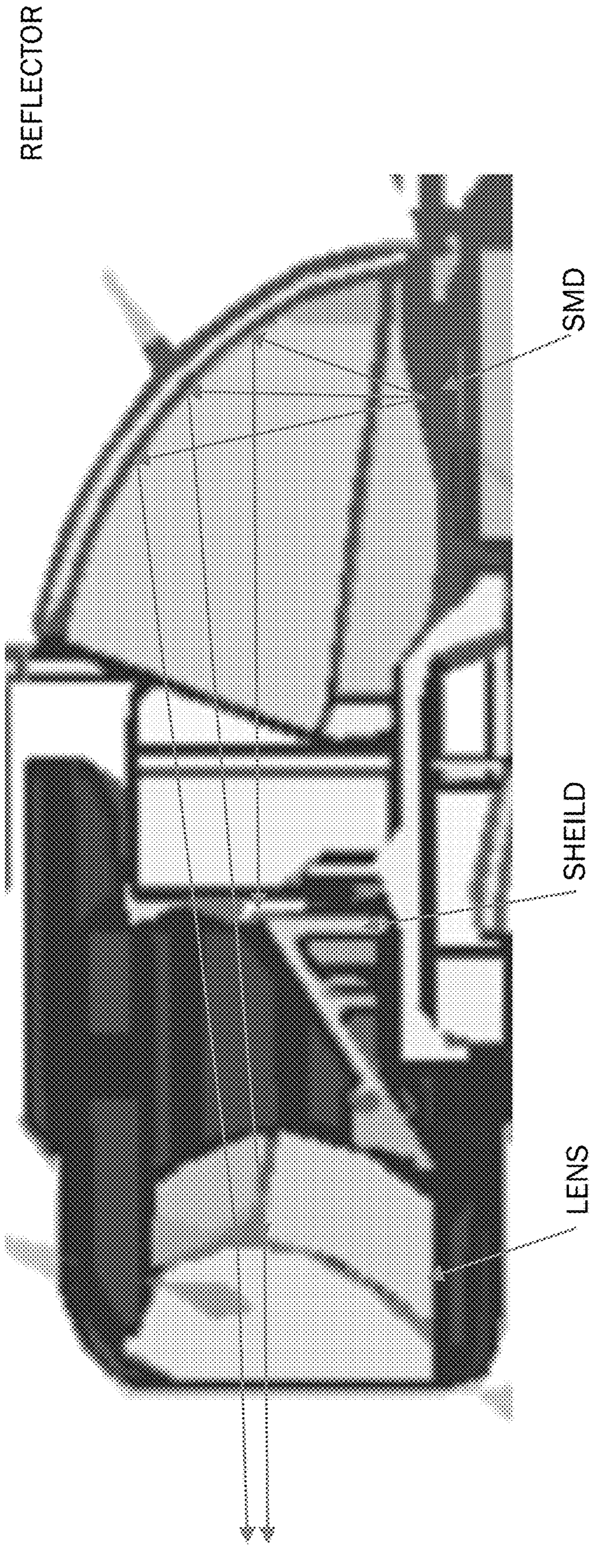
FIGURE 9 Headlamp Design LB Light Rays

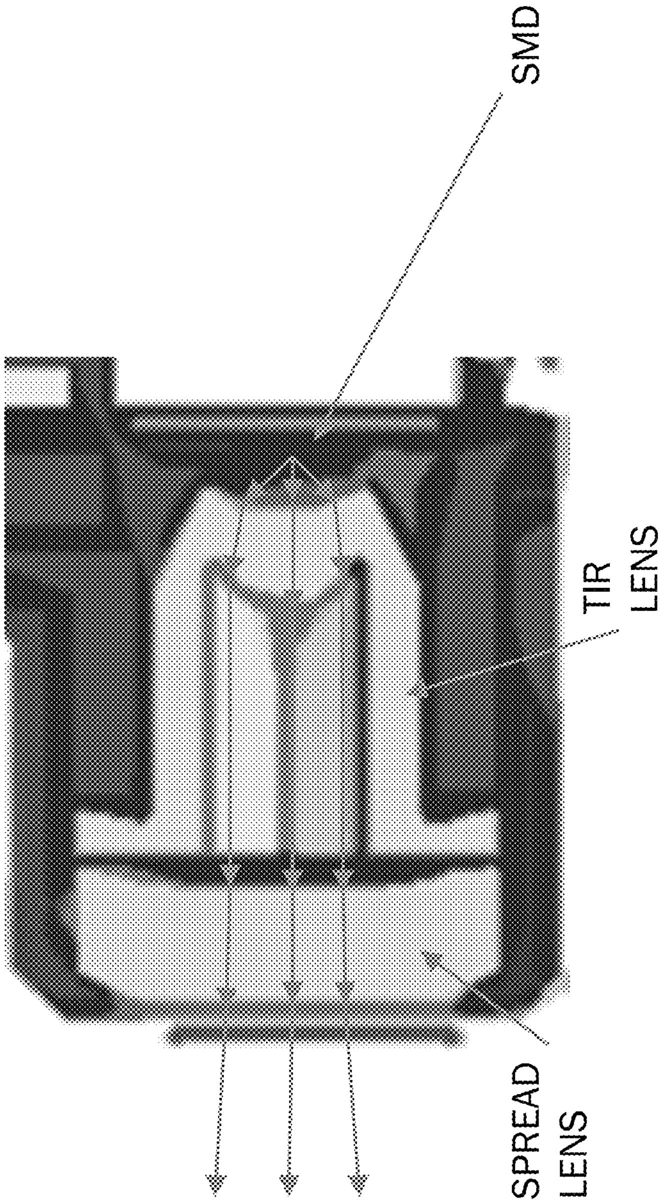
FIGURE 10 Headlamp Design HB Light Rays

FIGURE 11 Headlamp Thermal solution #1
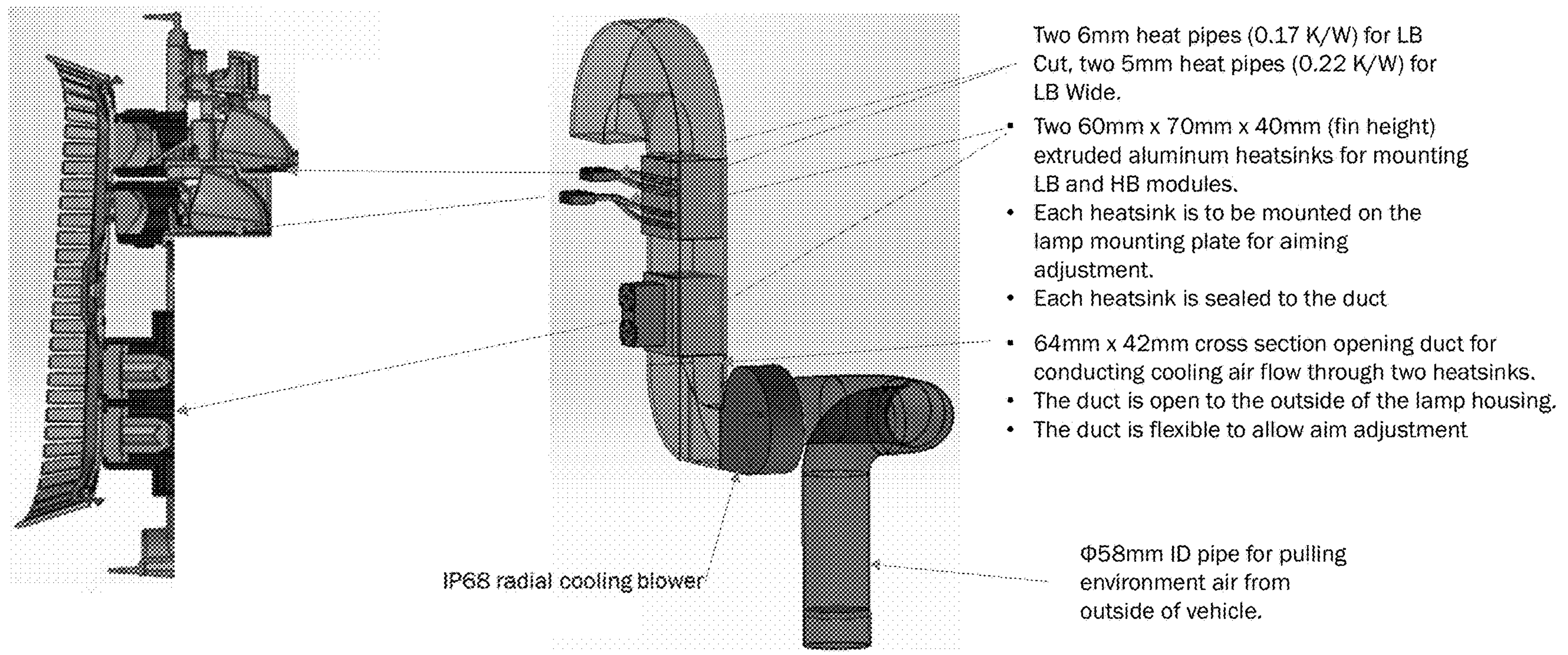

FIGURE 12 Headlamp Thermal solution #2

Two 6mm heat pipes (0.17 K/W) for LB Cut, two 5mm heat pipes (0.22 K/W) for LB Wide.

- Two 60mm x 70mm x 40mm (fin height) extruded aluminum heatsinks for mounting LB and HB modules.
- Each heatsink is to be mounted on the lamp mounting plate for aiming adjustment.
- Each heatsink is sealed to the duct
- 64mm x 42mm cross section opening duct for conducting cooling air flow through two heatsinks.
- The duct is open to the outside of the lamp housing.
- The duct is flexible to allow aim adjustment

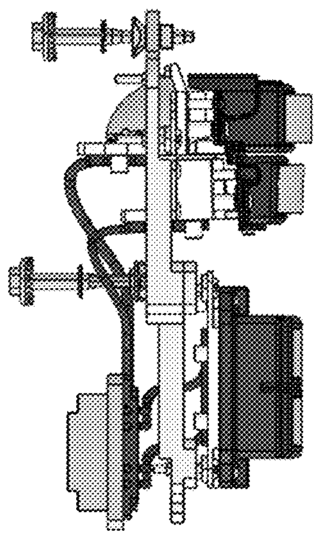

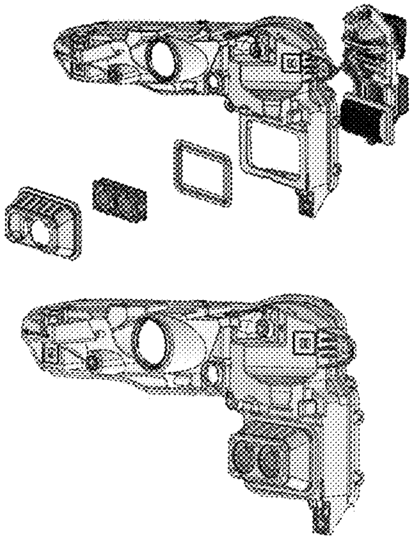

FIGURE 13 – Headlamp Thermal Solution #3
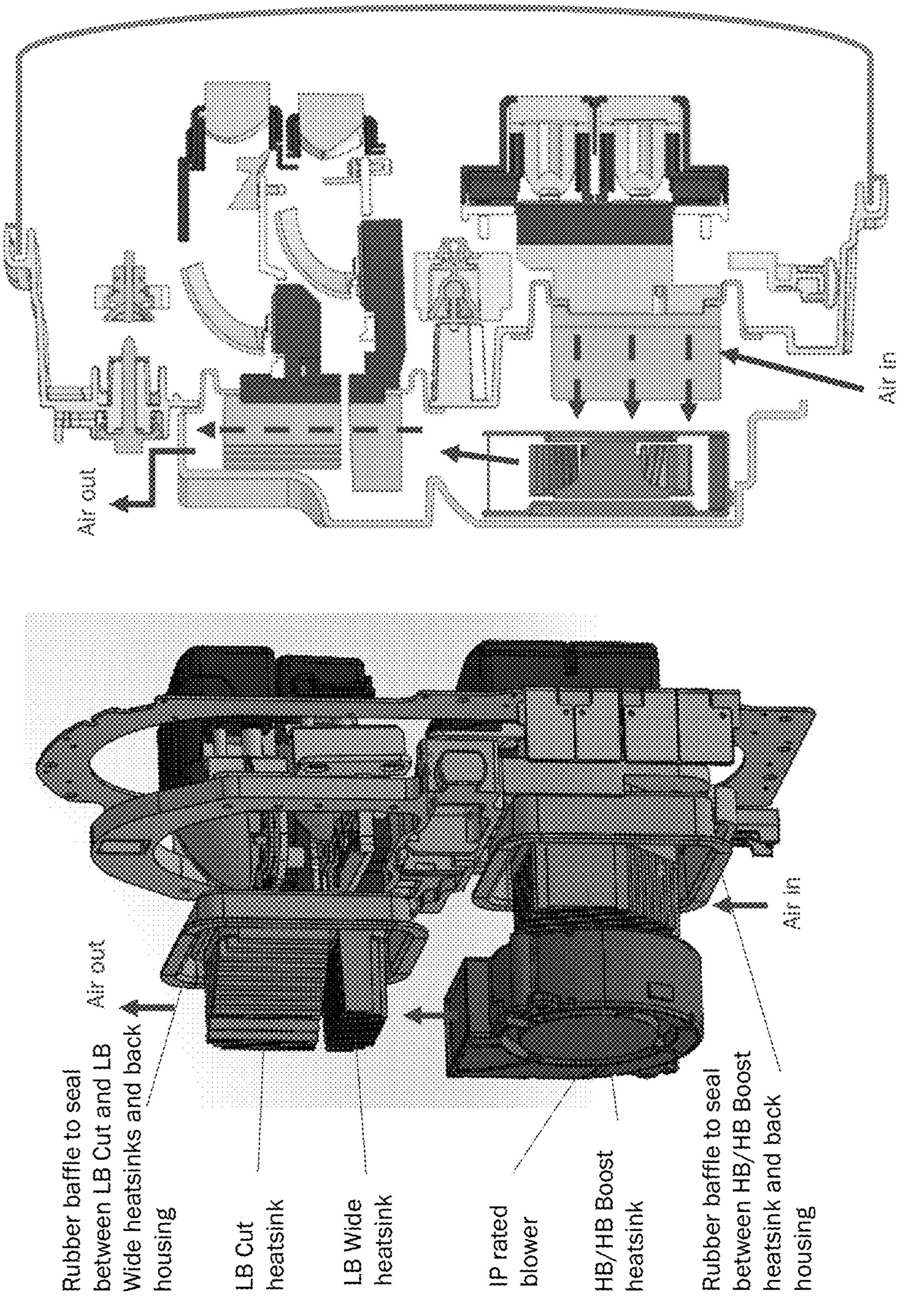

FIGURE 14: LaserLight SMD and LED comparison - emission pattern

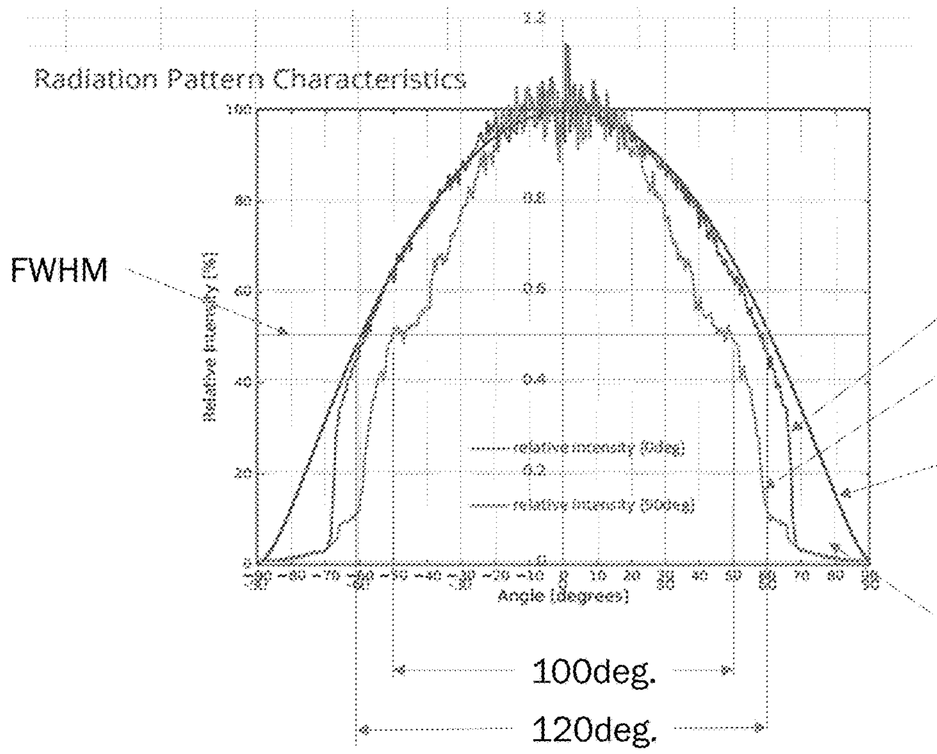

The emission pattern intensity of the SMD is narrower by a significant amount

SMD 0 Deg

SMD 90 Deg

LED (Symetrical pattern)

Low amounts of light is emitted at wide angles from both sources but LaserLight SMD has lower emission here. This light emission is difficult to capture with an optical system and is typically wasted.

FIGURE 15 LaserLight SMD and LED comparison – Luminance/Size

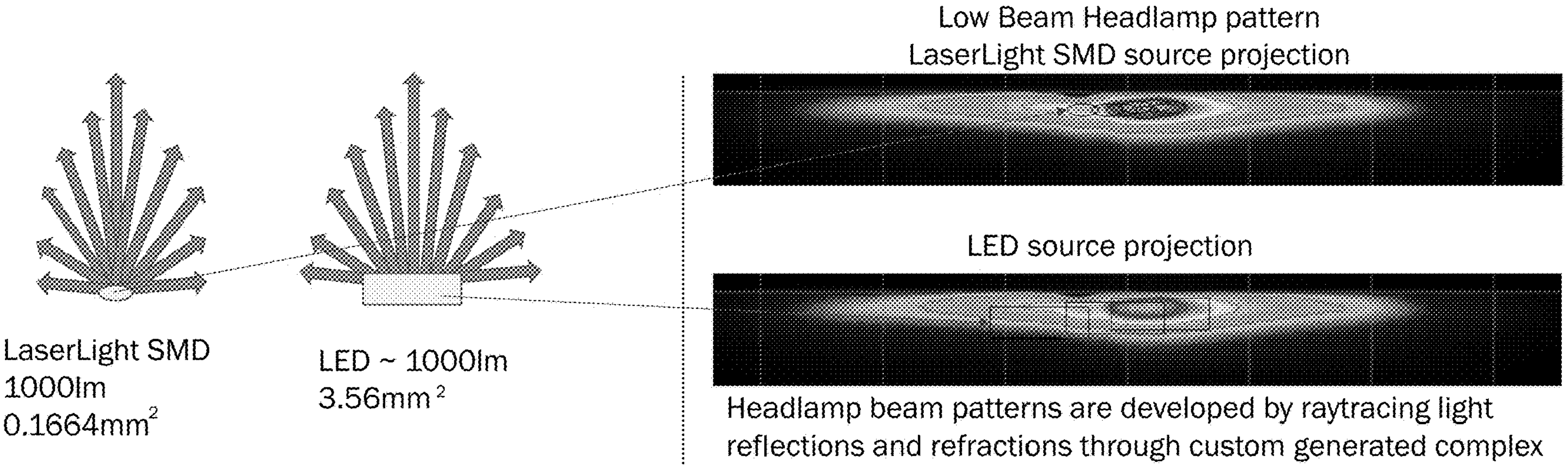

- 5.5 times the luminance of LED sources
- 5.5 times brighter than LED sources

Headlamp beam patterns are developed by raytracing light reflections and refractions through custom generated complex B-surface topology. ‘Filament imaging’ is the process by which the size and shape of the light emitting area is reflected/refracted through optical elements and formed into a pattern. The smaller and simpler the light emitting area is, the less compromises need to be made in filliing out the desired beam pattern. The high luminance “point source” allows finer control of light compared to an “area source”.

FIGURE 16 LaserLight SMD and LED comparison – Luminance cont.
LaserLight SMD 1000lm 0.1664 $^2$
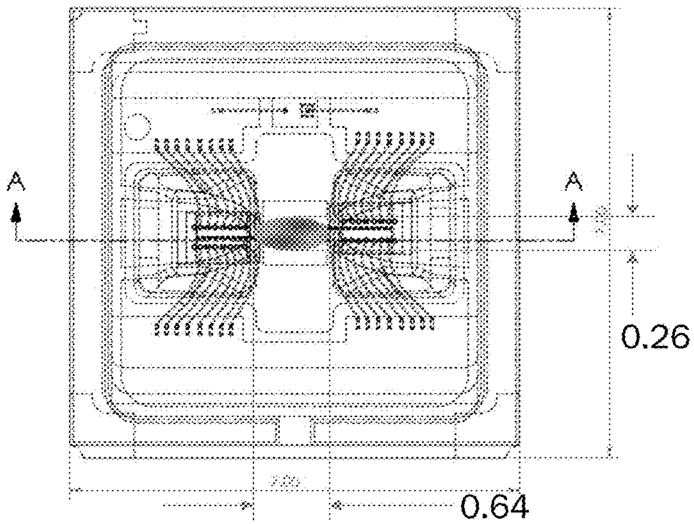
LaserLight SMD has 5.5 times the luminance of LED sources.
For a unit area LaserLight is 5.5 times brighter than LED sources.
LED ~ 1000lm 3.56mm$^2$
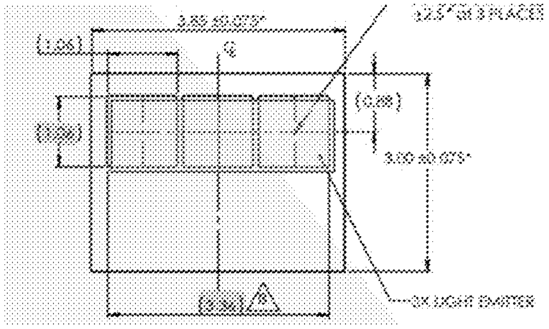
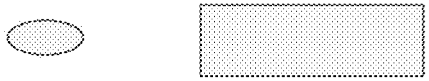
1100cd/mm$^2$ vs 200cd/mm$^2$
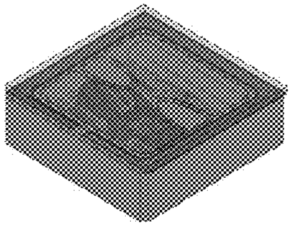

FIGURE 17 High Level Description and Value Proposition
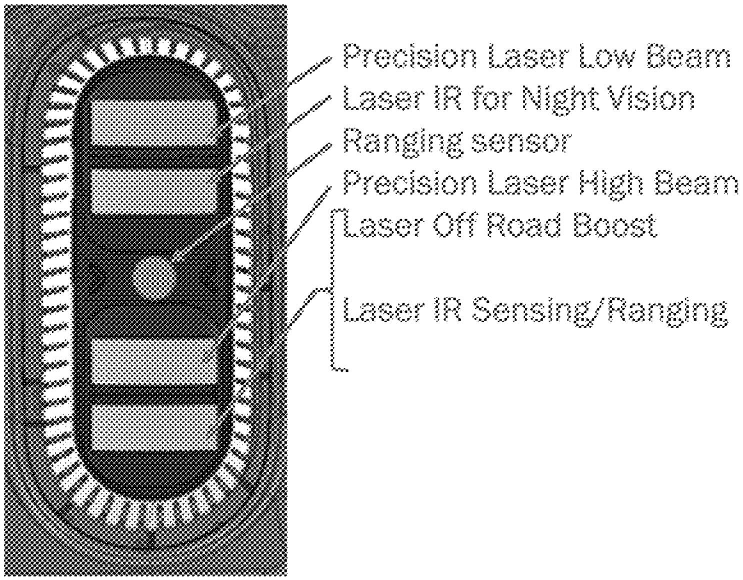
| | LB Flux/Intensity | HB Flux/Intensity | LB Width | LB Length | Lens Height |
|---|---|---|---|---|---|
| Laser | 1500lm/45Kcd | 3000lm/213Kcd | 44m | 127m | 25mm |
| LED | 3600lm/30Kcd | 7200lm/79.7Kcd | 32m | 112m | 35mm |

LASER HIGH BEAM AND LOW BEAM HEADLAMP APPARATUS AND METHOD

BACKGROUND

In 1960, the laser was demonstrated by Theodore H. Maiman at Hughes Research Laboratories in Malibu. This laser utilized a solid-state flash lamp-pumped synthetic ruby crystal to produce red laser light at 694 nm. Early visible laser technology comprised lamp-pumped infrared solid-state lasers with the output wavelength converted to the visible using specialty crystals with nonlinear optical properties. For example, a green lamp-pumped solid-state laser had three stages: electricity powers lamp, lamp excites gain crystal which lases at 1064 nm, 1064 nm goes into frequency conversion crystal which converts to visible 532 nm. The resulting green and blue lasers were called "lamp-pumped solid-state lasers with second harmonic generation" (LPSS with SHG), had wall plug efficiency of ~1%, and were more efficient than Ar-ion gas lasers, but were still too inefficient, large, expensive, and fragile for broad deployment outside of specialty scientific and medical applications.

To improve the efficiency of these visible lasers, high power diode (or semiconductor) lasers were utilized. These "diode-pumped solid-state lasers with SHG" (DPSS with SHG) had three stages: electricity powers 808 nm diode laser, 808 nm excites gain crystal, which lases at 1064 nm, 1064 nm goes into frequency conversion crystal which converts to visible 532 nm. As high-power laser diodes evolved and new specialty SHG crystals were developed, it became possible to directly convert the output of the infrared diode laser to produce blue and green laser light output. These "directly doubled diode lasers" or SHG diode lasers had 2 stages: electricity powers 1064 nm semiconductor laser, 1064 nm goes into frequency conversion crystal which converts to visible 532 nm green light. These lasers designs are meant to improve the efficiency, cost and size compared to DPSS-SHG lasers, but the specialty diodes and crystals required make this challenging today.

Although semiconductor lasers have been successfully deployed in a variety of applications, however, automotive headlamp applications continue to rely on conventional headlamp technologies, such as high-intensity discharge, halogen filaments, and more recently, light-emitting diodes, commonly called LEDs. The conventional technologies include a projector ellipsoid system halogen headlamp, commonly called PES, a lens optic design, among others. The conventional technologies for headlamps tend to be limited in range, in both distance and pattern, and have a large form factor. These and other limitations exist with such conventional technologies, as will be described more specifically throughout the present specification and more particularly below.

SUMMARY

According to the present invention, techniques including methods and devices, for optical technology, are provided. In particular, the present invention provides apparatuses, methods, and devices for optical devices, and in particular, a laser light for use with high beam and low beam lighting for a vehicle, such as an automobile, truck, boat, or other moving and non-moving entity. More particularly, the present invention provides a small form factor high beam and low beam apparatus for a vehicle.

In an example, the present invention provides a lighting apparatus. The lighting apparatus can be configured on a vehicle, such as an automobile, truck, boat, or other moving vehicle. In an example, the lighting apparatus has a blue laser device comprising a gallium and nitrogen containing material (e.g., GaN) configured to emit electromagnetic radiation having a wavelength ranging from about 400 nm to 500 nm and having a beam spot sized to create a blue laser output beam. The apparatus has a phosphor material configured to interact with the blue laser output beam of the blue laser device to generate a white light output of electromagnetic radiation characterized by a point source output of 400 to 2500 lumens. The apparatus has a surface mount substrate configured for coupling the blue laser device on a surface of the surface mount device and a lens device operably coupled to the white light output to focus and spread the white light output to cause formation of a white light beam. The lens device may be integrated with the blue laser device or additional to the blue laser device. The apparatus could include an infrared laser device configured to output electromagnetic radiation having a wavelength ranging from 840 nm to 1550 nm or from 800 nm to 1800 nm, mounted in an hermetically sealed housing in such a way that both the white and IR point emission from the phosphor material are overlapping and having a beam pattern output angle ranging from one degree full width half maximum to ten degrees full width half maximum or to 45 degrees full width half maximum or more to create an infrared output beam.

In an alternative example, the present techniques also include a plurality of laser lamp modules. In an example, the plurality of laser lamp modules includes a high beam wide lamp module, a high beam narrow lamp module, a low beam cut lamp module, and a low beam wide lamp module, each of which is sealed from an outside environment for reliability.

Some embodiments of the present invention provide a system or apparatus configured with an infrared (IR) illumination source integrated with a gallium and nitrogen containing laser diodes based white light source. With the capability to emit light in both the visible light spectrum and the infrared light spectrum, the system or apparatus is at least a dual band emitting light source. In some embodiments the gallium and nitrogen containing laser diode is fabricated with a process to transfer gallium and nitrogen containing layers and methods of manufacture and use thereof. In some embodiments the system or apparatus contains sensors to form feedback loops that can activate the infrared illumination source and/or the laser based white light illumination source. Merely by example, the invention provides remote and integrated smart laser lighting devices and methods, configured with infrared and visible illumination capability for spotlighting, detection, imaging, projection display, spatially dynamic lighting devices and methods, LIDAR, LiFi, and visible light communication devices and methods, and various combinations of above in applications of general lighting, commercial lighting and display, automotive lighting and communication, defense and security, search and rescue, industrial processing, internet communications, agriculture or horticulture. The integrated light source according to this invention can be incorporated into an automotive headlight, a general illumination source, a security light source, a search light source, a defense light source, as a light fidelity (LiFi) communication device, for horticulture purposes to optimize plant growth, or many other applications.

In an aspect, some embodiments provide novel uses and configurations of gallium and nitrogen containing laser diodes in lighting systems configured for IR illumination, which can be deployed in dual spectrum applications. Configured with a laser based white light source and an IR light source, this invention is capable of emitting light both in the visible wavelength band and in the IR wavelength band and is configured to selectively operate in one band or simultaneously in both bands. This dual band emission source can be deployed with static or dynamic spatial patterning using beam shaping elements such as MEMS scanning mirrors or digital light processing units, and communications triggered by integrated sensor feedback. Specific embodiments of this invention employ a transferred gallium and nitrogen containing material process for fabricating laser diodes or other gallium and nitrogen containing devices enabling benefits over conventional fabrication technologies.

In accordance with an embodiment, a mobile machine includes a white light system and an infrared (IR) system. The white light system includes a gallium and nitrogen containing laser diode having a ridge waveguide with facet regions on ends of the ridge waveguide, wherein the gallium and nitrogen containing laser diode is configured to output directional electromagnetic radiation through one of the facet regions, where the directional electromagnetic radiation from the gallium and nitrogen containing laser diode characterized by a first peak wavelength; a first wavelength converter arranged in a pathway of the directional electromagnetic radiation from the gallium and nitrogen containing laser diode, wherein the first wavelength converter is configured to convert at least a fraction of the directional electromagnetic radiation with the first peak wavelength to at least a second peak wavelength that is longer than the first peak wavelength and to generate a white light emission comprising at least the second peak wavelength; and a common support member configured to support the gallium and nitrogen containing laser diode and the first wavelength converter. The IR system includes an infrared emitting laser diode configured to output an infrared emission, the infrared emitting laser diode configured to output a directional electromagnetic radiation characterized by a third peak wavelength in the infrared region of the electromagnetic radiation spectrum.

In an embodiment, the gallium and nitrogen containing laser diode and/or the infrared emitting laser diode are configured for use with time-of-flight sensing, LIDAR sensing, or other sensing applications.

In another embodiment, the IR system is configured for a night vision or IR illumination application and is configured to operate independently from the gallium and nitrogen containing laser diode.

Merely by way of example, the present invention can be applied to vehicle applications such as white or infrared lighting, white or infrared spot lighting, dynamic lighting, smart lighting, flash lights, automobile headlights, automobile position lighting and any lighting function, mobile machine lighting such as autonomous machine lighting and drone lighting, all-terrain vehicle lighting, light, sensing or communication systems, navigation systems, advanced driver assistance systems (ADAS), autonomous or semi-autonomous mobile machines and robots, sources used in recreational sports such as biking, surfing, running, racing, boating, light sources used for automobiles, motorcycles, drones, planes, aircraft, marine craft, robots, other mobile or robotic applications, safety, counter measures in defense applications, and others. In an example, one or more of the techniques can be applied to multi-colored lighting, lighting for flat panels, medical applications including cancer treatment or ablation or cosmetic surgery, metrology and measurement applications, beam projectors and other display devices and systems, frequency doubling systems such as second harmonic generation (SHG) systems, SHG systems combined with nonlinear crystals like barium borate (BBO) for producing wavelengths in the 200 nm to 400 nm range, wearable displays, augmented reality systems, mixed reality systems, virtual reality systems, high-intensity lamps, spectroscopy, entertainment, theater, music, and concerts, analysis fraud detection and/or authenticating, tools, purification, sterilization, anti-virus, anti-bacterial, water treatment, security systems, laser dazzlers, targeting, communications, LiFi, visible light communications (VLC), sensing, detecting, distance detecting, Light Detection And Ranging (LIDAR), smart infrastructure such as smart factories or smart homes, transformations, transportations, leveling, curing and other chemical treatments, heating, cutting and/or ablating, welding, marking, laser direct imaging, pumping other optical devices, other optoelectronic devices and related applications, storage systems, quantum computing, quantum cryptography, quantum storage, source lighting, and the like.

BRIEF DESCRIPTION OF DRAWINGS

The following drawings are merely examples for illustrative purposes according to various disclosed embodiments and are not intended to limit the scope of the present invention.

FIG. 5 is a more detailed diagram of a low beam module light path according to an example of the present invention.

FIG. 6 is a more detailed diagram of a high beam module light path according to an example of the present invention.

FIG. 7 is a side view diagram of a low beam and a high beam headlamp apparatus according to an example of the present invention.

FIG. 8 is a more detailed side view diagram of a low beam headlamp module and a high beam head lamp module according to an example of the present invention.

FIG. 9 is a more detailed side view diagram of the low beam headlamp module of FIG. 7.

FIG. 10 is a more detailed side view diagram of a high beam headlamp module of FIG. 7.

FIG. 11 is a simplified diagram of a thermal management device according to an example of the present invention.

FIG. 12 is a simplified diagram of an alternative thermal management device according to an example of the present invention.

FIG. 13 is a simplified diagram of an alternative thermal management device according to an example of the present invention.

FIGS. 14 through 17 are simplified diagrams illustrating experimental results according to examples of the present invention.

DETAILED DESCRIPTION OF EXAMPLES

Figure 1:
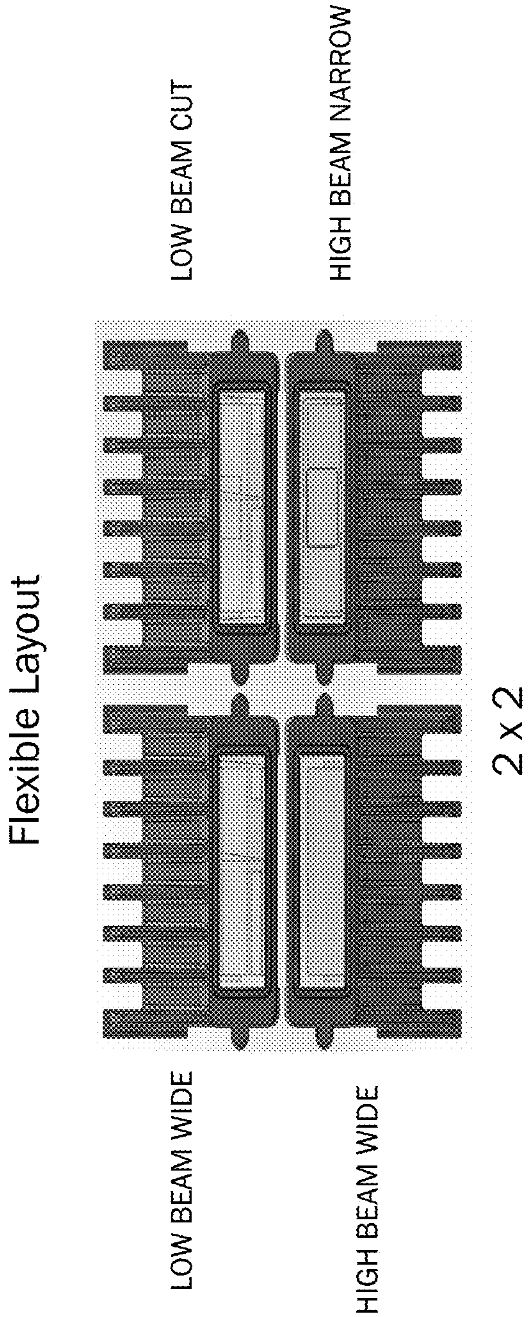
FIG. 1 is a simplified diagram of a high beam and low beam two by two module lamp assembly according to an example of the present invention.

The present invention provides techniques, including methods and devices, for optical technology. For example, the present invention provides apparatuses, methods, and devices for optical devices, and in particular, a laser light for use with high beam and low beam lighting for a vehicle, such as an automobile, truck, boat, or other moving or non-moving entity. More particularly, the present invention provides a small form factor high beam and low beam apparatus for a vehicle.

In an example, the present invention provides a lighting apparatus configured as an N by M array of headlamp modules, where N is an integer of one and greater, and M is an integer of one and greater. In an example, the apparatus has a low beam wide lamp module. The low beam wide module has a first blue laser device having a predetermined output power and is made of a gallium and nitrogen containing material configured to emit electromagnetic radiation having a wavelength ranging from about 400 to 500 nm and having a first beam spot size with a first blue laser output beam. The low beam wide module also has a first phosphor material configured to interact with first the blue laser output beam of the first blue laser device to generate a first white light output of electromagnetic radiation characterized by an output of 400 to 2500 lumens, a first surface mount substrate configuring to attach the first blue laser device on a surface of the first surface mount device, and a first lens device operably coupled to the first white light output to focus and spread the first white light output to cause formation of a low beam wide white light.

In an example, the apparatus also has a high beam wide lamp module. The high beam wide module has a second blue laser device having a predetermined output power and is made of a gallium and nitrogen containing material configured to emit electromagnetic radiation having a wavelength ranging from about 400 to 500 nm and having a second beam spot size with a second blue laser output beam. The high beam wide module has a second phosphor material configured to interact with second the blue laser output beam of the second blue laser device to generate a second white light output of electromagnetic radiation characterized by an output of 400 to 2500 lumens. The module has a second surface mount substrate configuring to attach the second blue laser device on a surface of the second surface mount device and a second lens device having a total internal reflection element operably coupled to the second white light output to focus and spread the second white light output to cause formation of a high beam wide white light.

In an example, the apparatus has a low beam cut lamp module. The low beam cut lamp module has a third blue laser device having a predetermined output power and is made of a gallium and nitrogen containing material configured to emit electromagnetic radiation having a wavelength ranging from about 400 to 500 nm and having a third beam spot size with a third blue laser output beam. The module has a third phosphor material configured to interact with the third blue laser output beam of the third blue laser device to generate a third white light output of electromagnetic radiation characterized by an output of 400 to 2500 lumens. The module has a third surface mount substrate configuring to attach the third blue laser device on a surface of the third surface mount device and a third lens device operably coupled to the third white light output to focus and spread the third white light output to cause formation of a low beam cut white light.

In an example, the apparatus has a high beam narrow lamp module. The module has a fourth blue laser device having a predetermined output power and is made of a gallium and nitrogen containing material configured to emit electromagnetic radiation having a wavelength ranging from about 400 to 500 nm and having a fourth beam spot size with a fourth blue laser output beam. The apparatus has a fourth phosphor material configured to interact with the fourth blue laser output beam of the fourth blue laser device to generate a fourth white light output of electromagnetic radiation characterized by an output of 400 to 2500 lumens. The apparatus has a fourth surface mount substrate configuring to attach the fourth blue laser device on a surface of the fourth surface mount device and a fourth lens device operably coupled to the fourth white light output to focus and spread the fourth white light output to cause formation of a high beam narrow white light.

In an example, the apparatus includes an infrared laser device configured to output electromagnetic radiation having a wavelength ranging from 840 nm to 1550 nm. In an example, the infrared device has a beam spot size ranging from one-degree full width half maximum to ten degrees full width half max, and preferably four to six degrees full width half max, and more preferably five degrees full width half max to create an infrared output beam. In an example, night vision using infrared laser light is configured with a larger spot size and beam angle, e.g., +/−45 Degrees, while range finding, LIDAR, and other applications may use a smaller spot size. In optional example, the infrared laser device is coupled to one or more of the headlamp modules.

In an example, the apparatus has an image capturing device configured with any one of the modules to collect a reflected pattern from the infrared laser device. The apparatus has a display coupled to the image capturing device to display an image associated with the reflected pattern information.

In an example, an N by M array is one by four or N×M is two by two. Further details of the N by M array can be found throughout the present specification and more particularly below.

In some embodiments the laser based white light source configured with an IR illumination source is configured with an IR sensor or an IR imaging system. The IR illumination source of the present invention would be used to direct IR electromagnetic radiation toward a target area or subject and an IR sensor or imaging system would be deployed to detect the presence, movement, or other characteristics of a subject matter or object within the illumination area. Once a certain characteristic was detected by the IR sensor, a response could be triggered. Infrared is radiated strongly by hot bodies such as people, vehicles and aircraft.

Infrared waves are not visible to the human eye. In the electromagnetic spectrum, infrared radiation can be found between the visible and microwave regions. The infrared waves typically have wavelengths between 0.75 and 1000 μm. The infrared spectrum can be split into near IR, mid IR and far IR. The wavelength region from 0.75 to 3 μm is known as the near infrared region. The region between 3 and 6 μm is known as the mid-infrared region, and infrared radiation which has a wavelength greater higher than 6 μm is known as far infrared.

Thermal imaging systems use mid- or long wavelength IR energy and are considered passive, sensing only differences in heat. These heat signatures are then displayed on a screen, monitor, or some other readout device. Thermal imagers do not see reflected light and are therefore not affected by surrounding light sources such as oncoming headlights.

Night vision and other lowlight cameras rely on reflected ambient light such as moonlight or starlight. Night vision is not effective when there is too much light, but not enough light for you to see with the naked eye such as during the twilight hours. Perhaps, even more limiting, the sensitivity of night vision imaging technology is limited if there is not enough ambient visible light available since the imaging performance of anything that relies on reflected light is limited by the amount and strength of the light being reflected. In many instances there are no natural sources of illumination available in places such as tunnels. In these situations, active illumination with IR sources that are not detectable to the human eye can be used to illuminate an area or a target. These active imaging systems include IR illumination sources to generate their own reflected light by projecting a beam of near-IR energy that can be detected in the imager when it is reflected from an object. Such active IR systems can use short wavelength infrared light to illuminate an area wherein some of the IR energy is reflected back to a camera and interpreted to generate an image.

Since this technology relies on reflected IR light to make an image with conventional IR illumination sources, the range and contrast of the imaging system can be limited. The laser based white light system configured with an IR illumination source according to the present invention offers a superior illumination source that can overcome these challenges of range and contrast. Since the IR illumination is originating from either directly from a highly directional IR emitting laser diode or from a laser diode excited IR emitting wavelength converter member, the IR emission can be orders of magnitude brighter than conventional LED IR emission. This 10 to 10,000×increased brightness using a laser based IR illumination source can increase the range by 10 to 1000× over LED sources and provide superior contrast.

IR detectors are used to detect the radiation which has been collected. In some embodiments, the current or voltage output from the detectors is very small, requiring pre-amplifiers coupled with circuitry to further process the received signals. The two main types of IR detectors are thermal detectors and photodetectors. The response time and sensitivity of photonic detectors can be much higher, but often these have to be cooled to reduce thermal noise. The materials in these are semiconductors with narrow band gaps. Incident IR photons cause electronic excitations. In photoconductive detectors, the resistivity of the detector element is monitored. Photovoltaic detectors contain a p-n junction or a p-i-n junction on which photoelectric current appears upon illumination.

In one embodiment, the detector technology used to generate the resulting image can be an IR photodiode which is sensitive to IR light of the same wavelength as that emitted by the IR illumination source. When the reflected IR light is incident on the photodiode, a photocurrent is generated which induces an output voltage proportional to the magnitude of the IR light received. These infrared cameras should have a high signal-to-noise ratio with a high sensitivity or responsivity. In one example, an InGaAs based photodiode is used for the IR detector. In other examples, InAs based photodiodes, InSb based photodiodes, InAsSb based photodiodes, PbSe based photodiodes, or PbS based photodiodes can be included. In some configurations according to the present invention, photodiode arrays are included for IR detection. Additionally, avalanche photodiodes (APD) are included in the present invention. The detectors can be configured to operate as photovoltaic or photoconductive conductors. In some examples according to the present invention, some combination of the described detector technologies are included two color detectors. In some examples amplifiers and photomultipliers are included.

FIG. 1 is a simplified diagram of a high beam and low beam two-by-two module lamp assembly according to an example of the present invention. As shown, the assembly includes a low beam cut module, a low beam wide module, a high beam wide module, and a high beam narrow module integrated together in the assembly. The assembly illustrates a front view diagram. The diagram includes a two-by-two module configuration, each of the modules including a lens and housing, as shown. Details of each module can be found throughout the specification and more particularly below.

Figure 2:
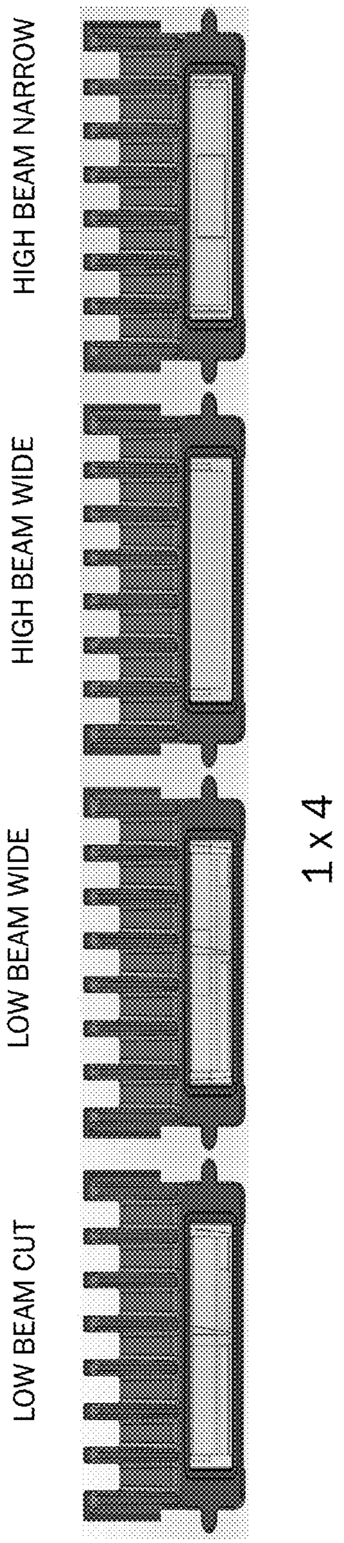
FIG. 2 is a simplified diagram of a high beam and low beam one by four lamp module lamp assembly according to an example of the present invention.

FIG. 2 is a simplified diagram of a high beam and low beam one by four lamp module lamp assembly according to an example of the present invention. As shown, the assembly includes a low beam cut module, a low beam wide module, a high beam wide module, and a high beam narrow module integrated together in the assembly. The assembly illustrates a front view diagram. The diagram includes a one by four module configuration, each of the modules including a lens and housing, as shown. Details of each module can be found throughout the specification and more particularly below.

Figure 3:
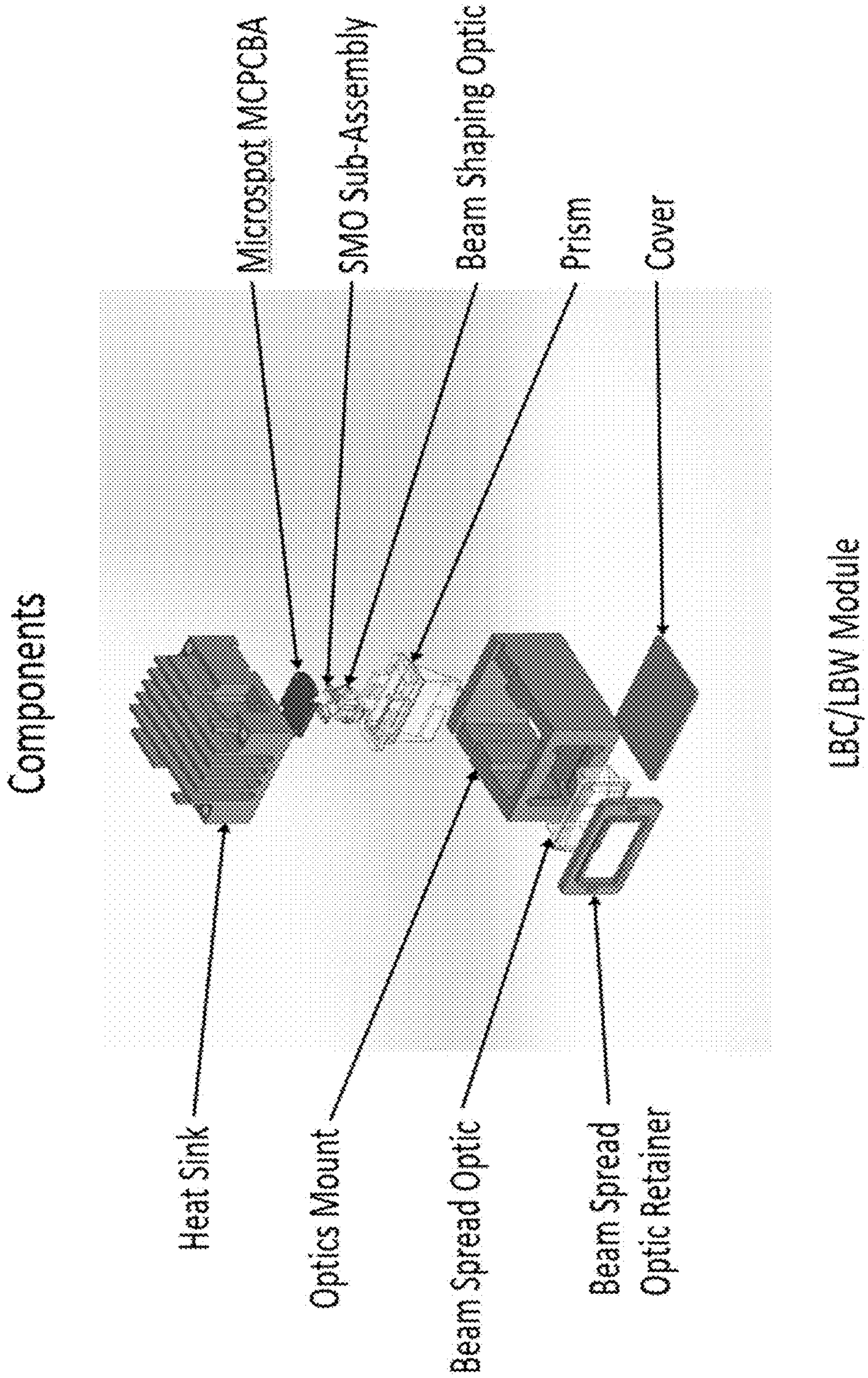
FIG. 3 is a more detailed diagram of a low beam cut or low beam wide module according to an example of the present invention.

FIG. 3 is a more detailed diagram of a low beam cut or low beam wide module according to an example of the present invention. In an example, each of the low beam modules includes common elements such as the light source, a heat sink, a beam-shaping optics single or multi elements, an optics mount, a beam spread optic, and a beam spread optic retainer, as expressed on a left side of the Figure. The heat sink function is to increase the heat flow away from the device light source, and the heat sink can be made of low thermal resistance material such as but not limited to metals such as aluminum, copper, tungsten, or alloys. The beam-shaping optics could be single or multi-elements as shown in this example and can be made of but not limited to plastic or glass. The optics mount has a primary mechanical function to hold the beam-shaping optics could be made of but not limited to plastic or metal. The beam spread optics function as a projector of the beam shaped to the road. It can be made but not limited to plastic or glass. The beam spread optics retainer mount has a primary mechanical function to hold the beam spread optics could be made of but not limited to plastic or metal. The low beam module also includes a Metal Core Printed Circuit Board Assembly (MCPCBA) on which the light source is mounted that has a function of spreading and transferring the heat generated to the heatsink. The metal core is made of low thermal resistance material such as but not limited to, metals such as aluminum, copper, tungsten, or alloys. The module has snail type lens (SMO) optics. The SMO optics subassembly can be made of but not limited to plastic or glass. The low beam module may also have beam-shaping optics, a prism, and cover as shown. The beam-shaping optics can be made of but not limited to plastic or glass. The prism is shaped to provide multiple functions such as redirecting the output of the beam-shaping optics and to provide a required cut in the projecting beam by dumping some light. The cover can be made of plastic or metal and provide a protective sealing function to protect from any contaminants all elements inside the module such as light source and optics.

Figure 4:
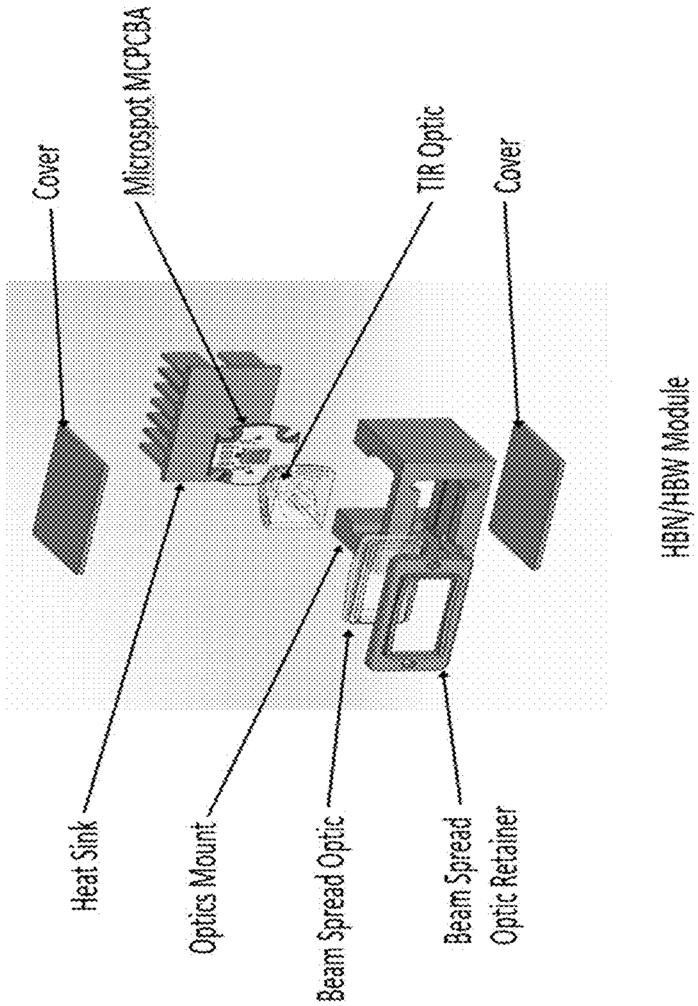
FIG. 4 is a more detailed diagram of a high beam narrow or a high beam wide module according to an example of the present invention.

FIG. 4 is a more detailed diagram of a high beam narrow or a high beam wide module according to an example of the present invention. As shown, each high beam module includes a heat sink, optics mount, a beam spread optic, a beam spread optic retainer, among other elements. The heat sink function being to increase the heat flow away from the device light source can be made of low thermal resistance material such as but not limited to metals such as aluminum, copper, tungsten or alloys. The optics mount has a primary mechanical function to hold the beam-shaping optics could be made of but not limited to plastic or metal. The beam spread optic function as a projector of the beam shaped to the road. It can be made of but not limited to plastic or glass. The beam spread optic retainer has a primary mechanical function to hold the beam spread optics could be made of but not limited to plastic or metal. Also shown, the module has a first cover near an upper region, a MCPBA on which the light source is mounted that has a function of spreading and transferring the heat generated to the heatsink. The metal core is made of low thermal resistance material such as but not limited to, metals such as aluminum, copper, tungsten or alloys, a total internal reflection (TIR) optic, and a second cover as shown near a bottom region. The first cover can be made of plastic or metal and provides a protective seal to protect the elements inside the module, such as light source and optics, from any contaminants. The second cover can be made of plastic or metal and provides a protective seal to protect the elements inside the module, such as light source and optics, from any contaminants. The TIR optic has a function of collimating the beam to a targeted beam angle and can be made primarily of plastic or glass.

Preferably, each of the modules is sealed in design to prevent an external environment from entering an internal region of the module. The required sealing is done in air and may be able to achieve an IP68 rating. It could be achieved by the means of numerous different techniques such as an appropriate sealant, O-ring, welding, or other.

FIG. 5 is a more detailed diagram of a low beam module light path according to an example of the present invention. As shown, the low beam module includes a snail type lens (SMO) to collect light from a surface mount device (SMD) light source. The beam-shaping optic starts to shape patterns and sends light downward (in the Figure) to a prism. The prism reflects light 90 degrees to the front portion. A specially designed monolithic feature in the prism acts as a beam dump feature to create a cutoff in the projected beam with a minimal amount of light to be lost. The output beam-spread optic forms a final pattern for white low beam light on a roadway. In an example, the low beam has both widespread and a focused spot of high intensity on the road. The low beam light is free from emitted glare light above a horizon region, especially on the oncoming traffic lane.

FIG. 6 is a more detailed diagram of a high beam module light path according to an example of the present invention. As further shown, the high beam module includes a total internal reflection (TIR) type lens to collect light from a surface mount device (SMD) light source and send the light forward. Light is then sent through a spread lens to form a final pattern on the road. The high beam light has a smaller spread than the low beam light and is more concentrated above a horizon region.

FIG. 7 is a side view diagram of low beam and high beam headlamp apparatus according to an example of the present invention. As shown, the apparatus has a low beam cut module, a low beam wide module (which can include near infrared laser light), a high beam wide module (which can include near infrared laser light), and a high beam narrow module (which can include near infrared laser light that is pulsed or not pulsed).

FIG. 8 is a more detailed side view diagram of a low beam headlamp module and a high beam head lamp module according to an example of the present invention. FIG. 9 is a more detailed side view diagram of the low beam headlamp module of FIG. 7. FIG. 10 is a more detailed side view diagram of a high beam headlamp module of FIG. 7.

FIG. 11 is a simplified diagram of an alternative thermal management device according to an example of the present invention. In this example, the present invention provides an alternative thermal management system. The system uses heat pipes that transport thermal energy from each module to a heat sink/heat exchanger configuration that facilitates transfer of the thermal energy outside of the sealed headlamp. In an example, the system includes an externally mounted fan(s) directing airflow to the heat exchanger that forces thermal energy out of the module. Such a system enables the transfer of heat energy in excess of 80 W, allowing the light sources to remain reliable in continuous operating conditions in the range of 40° C. to 60° C. environment temperature.

FIG. 12 is a simplified diagram of a thermal management device according to an example of the present invention. In an example, the present apparatus can dissipate a high thermal load in excess of 80 W out of a sealed lamp design. The sealed lamp design includes a thermal management system, including related devices. The thermal management system transfers thermal energy from interior regions of the module to an outside heat sink. In an example, the present thermal management system can include heat sinks coupled to openings in a housing of the module and seal such openings using baffles, allowing module alignment capability. In an example, the low beam module's mounting plates are thermally connected using heat pipes to a heat transfer unit mounted to the headlamp back housing by the means of baffles, of which flexibility provide the alignment capability required, the high beam modules are mounted directly to the heat transfer unit mounted to the headlamp back housing by the means of baffles of which flexibility provide the alignment capability required. The back of the headlamp is equipped of a system which includes ductwork or piping pulling air from outside of a vehicle using a radial cooling blower. The ductwork includes the heat sink part of the heat exchanger and are mounted directly in the ductwork. The heat sinks being thermally coupled to each of the high beam modules to draw thermal energy from the modules. The ductwork also includes a heat sink mounted to the low beam wide module to draw thermal energy from such module. The ductwork is mechanically sealed with each of the lamp modules and prevents any moisture from entering inside of the modules. In an example, the ductwork also protects each of the heatsinks from any impurities (e.g., dirt, mud, moisture) from the environment.

FIG. 13 is a simplified diagram of an alternative thermal management device according to an example of the present invention. In this example, the present invention provides an alternative thermal management system. The system uses heat transfer configuration for each module that transports thermal energy from the modules to heat sinks located outside the sealed headlamp. In an example, the system includes an externally mounted IP68-rated blower directing airflow to the heat exchanger that forces thermal energy out of the module. In some embodiments, each of the headlamp modules (e.g., low beam cut module, low beam wide module, high beam wide module, high beam narrow module) may have heat transferred to a heatsink (e.g., an extruded aluminum heatsink) disposed outside the housing and sealed with a baffle (e.g., rubber baffle) to allow individual adjustment.

FIGS. 14 through 19 are simplified diagrams illustrating experimental results according to examples of the present invention. Experiments were performed to compare performance of laser light against conventional light-emitting diode (LED) lighting. These experiments are merely examples and should not unduly limit the scope of the claims herein. In an example referring to FIG. 14, we measured an emission pattern of the present surface mount device configured with the blue laser and phosphor for white light emission. As shown, the emission pattern of the laser is much narrower than a conventional LED. By way of the narrower emission, the present apparatus has a higher efficiency in collecting a primary emission of white light.

In FIG. 15, we analyze the luminance and emission size of the present laser apparatus against conventional LED emissions. As shown, the present laser apparatus has a luminance of 1000 lumens from a phosphor material having an area of 0.1664 millimeters squared. The conventional LED has 1000 lumens from a phosphor material, which has a much greater size of 3.56 millimeters squared. The present laser apparatus has 5.5 times the luminance of conventional LED sources and is 5.5 times brighter than conventional LED sources. As shown, headlamp beam patterns have been developed by raytracing light reflections and refractions through custom-generated complex B-surface topology. 'Filament imaging' is the process by which the size and shape of the light-emitting area is reflected/refracted through optical elements and formed into a pattern. The smaller and simpler the light-emitting area is, the less compromises need to be made in filling out the desired beam pattern. The high luminance "point source" allows finer control of light compared to an "area source" as shown. As further shown in FIG. 16, we illustrate an apparatus (e.g., SMD) with a laser light on the left side and a conventional LED based phosphor. The laser apparatus produces 1100 Candela/millimeter square against the conventional LED at 200 Candela/millimeter square.

FIG. 17 illustrates a simplified high-level front view a laser light module according to an example. As shown, the apparatus has a low beam, a laser IR for night vision, a ranging sensor, a laser light off-road boost, and a laser IR sensing and ranging module. Parameters of the various modules are illustrated. Of course, there can be other variations, modifications, and alternatives.

In an example, the present invention provides a lighting apparatus. The lighting apparatus can be configured on a vehicle, such as an automobile, truck, boat, or other moving vehicle. In an example, the lighting apparatus has a blue laser device comprising a gallium and nitrogen containing material configured to emit electromagnetic radiation having a wavelength ranging from about 400 nm to 500 nm and having a beam spot size to create a blue laser output beam, e.g., point source. The apparatus has a phosphor material configured to interact with the blue laser output beam of the blue laser device to generate a white light output of electromagnetic radiation characterized by an output of 400 to 2500 lumens. The apparatus has a surface mount substrate configuring to attach the blue laser device on a surface of the surface mount device and a lens device operably coupled to the white light output to focus and spread the white light output to cause formation of a white light beam. The apparatus has an infrared laser device configured to output electromagnetic radiation having a wavelength ranging from 840 nm to 1550 nm and having a beam spot size ranging from one-degree full width half maximum to ten degrees full width half maximum to create an infrared output beam.

In an example, the infrared laser device is co-located so its beam is overlying the others already present in the surface mount device. In an example, the wavelength of the infrared laser device is ranging from 840 nm to 1550 nm. In an example, the apparatus also has an ultraviolet laser device configured with a wavelength ranging near 400 nm.

In an example, the infrared laser device is configured for a night vision application, a ranging and sensing application, a LIDAR application or a LiFi communication application. The infrared (IR) light can be used to improve visibility in the dark and to improve vision in fog, smoke, and other environments. The infrared light improves vision in the fog and smoke because it scatters less. The apparatus also has a sensing device operably coupled to the infrared laser device and configured to detect a reflection of the infrared output beam. For example, an IR camera may be used to obtain images using the IR illumination. In an embodiment, techniques such as image processing, machine learning, artificial intelligence, and the like may be used to process the images and determine more about an environment for advanced safety and/or functionality.

In an example, the white light beam shape is characterized by a range in excess of 1000 meters.

In an example, the surface mount substrate has a size of 4 mm to 10 mm in length. An example of the surface mount substrate can be found in U.S. Pat. No. 11,437,775, issued Sep. 6, 2022, commonly assigned, and hereby incorporated by reference.

In an example, the apparatus has an electrical source with a driver device independently coupled to the blue laser device and coupled to the infrared laser device. In an example, the electrical source can be at about 12 volts, or 24 volts, among others.

In an example, the lens device comprises a total internal reflection lens operably coupled to the point source on the phosphor material surface and a spread lens configured to shape the white light output to generate the white light beam.

In an example, the apparatus has an ellipsoidal reflector spatially positioned with the phosphor material to collect electromagnetic radiation and reflect the electromagnetic radiation to a shield device that allows a portion of the electromagnetic radiation to traverse through the lens device.

In an example, the apparatus has a thermal heat conducting material coupled to the surface mount substrate to transfer thermal energy from any combinations of blue, infrared or ultraviolet laser devices to a heat sink.

In an example, the blue laser device, the phosphor material, the surface mount substrate, and the infrared laser device are configured for a high beam application, a low beam application, a low beam cut application, and a high beam spot application, as described above.

In an example, the apparatus has a housing configured to partially enclose the surface mount substrate supporting any combinations of blue, infrared or ultraviolet laser devices blue laser device and the phosphor material.

In an example, the present laser light techniques have various benefits and/or advantages. In an example, the laser light source has luminance 1800 versus 200 cd/$mm^2$ from a conventional LED source. The laser light source also has a smaller form factor of 0.1664 $mm^2$ in chip size verses 3.56 $mm^2$ in chip size for a conventional LED source.

In an example, the present techniques also have dual emission including white visible and near infrared non-visible spectrums. As noted, other wavelengths such as ultraviolet (UV) and other colors can be included to share a spatial region with white visible light. As also described, the near infrared non-visible spectrum can be included using the same optical system as white light and blue laser source.

In an example, the present techniques also include a sealed lamp module design. In an example, each of the high beam wide lamp module, high beam narrow lamp module, low beam cut lamp module, and low beam wide lamp module is sealed from an outside environment for reliability. The module is sealed using sealant, O-ring or welding technique.

In an example, the present techniques have a larger usable light pattern. The light pattern is wider and has improved near field performance/comfort lighting. The light has a longer range and reach, up to 1000 meters or more. In an example, the light has improved homogeneity and a stronger gradient and cut off with lower glare. Additionally, the techniques provide for a smaller sized apparatus for streamlined externally adjustable headlamps with reduced complexity and mass. Of course, there can be other variations, modifications, and alternatives.

In an example, the present invention provides a head lamp apparatus for a high beam module or other applications. The apparatus has a substrate member comprising a printed circuit board material configured with a metal material configured as a thermal conductor to transfer thermal energy. In an example, the substrate material comprises a first electrical output and a second electrical output. The apparatus has a surface mount device comprising one or more metal bonding sites coupled to the substrate member using a metal-to-metal bond using one or more of the metal bonding sites of the surface mount device.

In an example, the surface mount device has a blue laser diode device (e.g., one or more devices) coupled to the first electrical output of the substrate member and configured to output a beam of electromagnetic radiation, and optionally, a near IR laser diode device coupled to the second electrical contact of the substrate.

In an example the surface mount device has a phosphor material configured as a circle with a diameter ranging from 50 μm, greater than 100 μm, greater than 200 μm, greater than 500 μm, greater than 1 mm, or greater than 10 mm. In some embodiments, an emission spot on the phosphor material may be circular or elliptical shaped and a smallest dimension of the emission intensity may be characterized by a full width at half maximum of less than 1 mm, less than 600 μm, or less than 300 μm.

The phosphor material may be configured with the blue laser diode device to interact with the beam of electromagnetic radiation to create an elliptical shape having a width to length ratio of one to two and output a primary emission beam of white light having a luminance characterized by 500 Candela/mm squared and greater. The apparatus has a TIR lens operably coupled to collect the primary emission and collimate the primary emission into parallel rays to traverse through a free space and a spread lens coupled to the TIR lens to receive the parallel rays from the free space at either a concave or convex surface of the spread lens and interacts with the parallel rays to output white light horizontally in reference to a plane parallel to a roadway.

In an example, the TIR lens configures the primary emission of one degree horizontally and one degree vertically to eight degrees vertically and up to 65 degrees horizontally, each of which is respect to a direction of a horizon.

In an example, the elliptical shape comprises a plurality of elliptical shapes, each of the elliptical shapes have a width to length ration ranging from one to two.

In an example, the apparatus is disposed in a small form factor package. The apparatus has a housing to enclose the substrate, surface mount device, TIR lens, and spread lens in a small form factor package. The housing includes an aperture for light to exit the apparatus. In an embodiment, the aperture has a height of less than 15 mm or less than 10 mm and a width of less than 30 mm or less than 20 mm.

In an example, the present invention provides yet an alternative lighting apparatus for a low beam applications, among others. The apparatus has a substrate member comprising a printed circuit board material configured with a metal material configured as a thermal conductor to transfer thermal energy. In an example, the substrate material comprises a first electrical output and a second electrical output. The apparatus has a surface mount device comprising one or more metal bonding sites coupled to the substrate member using a metal-to-metal bond. The surface mount device comprises a blue laser diode device (e.g., one or more devices) configured to emit electromagnetic radiation having a wavelength ranging from about 400 nm to 500 nm and coupled to the first electrical output of the substrate member, and configured to output a beam of electromagnetic radiation, and optionally, a near IR laser diode device coupled to the second electrical contact of the substrate. The apparatus has a phosphor material configured as a circle with a diameter ranging from 50 μm, greater than 100 μm, greater than 200 μm, greater than 500 μm, greater than 1 mm, or greater than 10 mm. The phosphor material may be configured with the blue laser diode device to interact with the beam of electromagnetic radiation to create an elliptical shape with a width to length ratio of one to 2 and output a primary emission beam of white light having a luminance characterized by 500 Candela/mm square and greater, with a directional path in a first direction.

The apparatus also has a snail type lens configured to collect the primary emission and output the primary emission in a first pattern and a beam-shaping optic configured to collect the primary emission beam in the first format and direct the primary emission in a second pattern. The apparatus has a prism device configured within an optical path of the primary emission in the second pattern from the beam-shaping optic and configured to redirect a first portion of the primary emission beam from the first direction (which can be a downward direction parallel to gravity) to a second direction (which is parallel to the horizon), where the first direction is normal to the second direction, and configured to cut off a second portion of the primary emission beam from the first portion of the primary emission beam. The apparatus has a free space region extending from the prism device and configured in the second direction, which is normal to the first direction and an output beam spread optic in communication with the free space region and configured to receive the second portion of the primary emission and configured to output the primary emission in a predetermined pattern.

In a preferred example, the apparatus has a housing with a width of 10 mm and less and a length of 20 mm and less to enclose the substrate, surface mount device, beam-shaping optic, prism device, and free space region in a small form factor package.

In a preferred example, the small form factor module has a width ranging from 10 mm to 20 mm, a depth ranging from 1 mm to 5 mm, and a length ranging from 20 mm to 40 mm.

In an example, the output of a primary white light beam from a phosphor material can range in size from 0.10 mm or more wide to 0.30 mm or more long to form a small spot size.

In an example, an optical efficiency from source to road is greater than 33% and less than 66%, greater than 25% and less than 75%, or greater than 15% and less than 85%.

In an example, the present lamp modules can be controlled using a headlamp electronic control unit to control each of the laser diode devices to be operable separately, concurrently, or in a pattern or flood mode. In an example, an output beam of the IR device and blue laser device can be spatially concurrent or coincide with each other, or alternatively be offset from each other depending upon the application.

The present apparatus and method can be implemented and applied to LiFi, sensing, and IR illumination, including functions, which can be found in commonly owned U.S. Publication Numbers 2022/0042672, published Feb. 10, 2022; 2019/0179015, published Jun. 13, 2019; and 2019/0097722, published Mar. 28, 2019, each of which is incorporated by reference for all purposes.

While the above is a full description of the specific embodiments, various modifications, alternative constructions, and equivalents may be used. As an example, the device can include any combination of elements described above, as well as outside of the present specification. Although the embodiments above have been described in terms of a laser diode, the methods and device structures can also be applied to other stimulated light-emitting devices. Therefore, the above description and illustrations should not be taken as limiting the scope of the present invention which is defined by the appended claims.

The invention claimed is:

1. A lighting apparatus for a mobile machine, comprising:

a blue laser diode device comprising a gallium and nitrogen containing material configured to emit electromagnetic radiation having a wavelength ranging from about 400 nm to 500 nm and having a beam spot size to create an output beam of the blue laser diode device;

a phosphor material configured to interact with the output beam of the blue laser diode device to generate a white light output of electromagnetic radiation characterized by an output of 400 to 2500 lumens and 500 Candela per square millimeter and greater;

a surface mount substrate configured to attach the blue laser diode device on a surface of the surface mount substrate;

a window or lens device operably coupled to the white light output of electromagnetic radiation and configured to focus and spread the white light output of electromagnetic radiation to cause formation of a white light beam;

an infrared laser diode device configured to output electromagnetic radiation having a wavelength ranging from 800 nm to 1800 nm and having an output beam to create an infrared output beam;

an electronic control unit configured to operate the blue laser diode device independent from the infrared laser diode device;

wherein the white light beam is configured for at least one of a high beam application, a low beam application, a low beam cut application, or a high beam spot application; and wherein the window or lens device is arranged so that the white light output of electromagnetic radiation and the infrared output beam propagate through the window or lens device colinearly.

2. The lighting apparatus of claim 1 wherein the blue laser diode device comprises a plurality of blue laser devices.

3. The lighting apparatus of claim 1 wherein the infrared laser device is coupled to the surface mount substrate so that the infrared output beam is overlying the output beam of the blue laser diode device.

4. The lighting apparatus of claim 1 further comprising an ultraviolet laser diode device configured to emit electromagnetic radiation having a wavelength ranging of about 400 nm.

5. The lighting apparatus of claim 1 wherein the white light output of electromagnetic radiation is characterized by a range of at least 600 meters or at least 1000 meters.

6. The lighting apparatus of claim 1 wherein the surface mount substrate has a size characterized by a length or width ranging from 4 mm to 12 mm.

7. The lighting apparatus of claim 1 further comprising an electrical source having a driver device separately coupled to the blue laser diode device and the infrared laser diode device, the electrical source configured to provide about 12 volts and greater.

8. The lighting apparatus of claim 1 wherein the window or lens device comprises a total internal reflection (TIR) lens operably coupled to the white light output of electromagnetic radiation and a spread lens configured to shape the white light output to generate the white light beam.

9. The lighting apparatus of claim 1 further comprising an ellipsoidal reflector spatially positioned relative to the phosphor material to collect the white light output of electromagnetic radiation and reflect the white light output of electromagnetic radiation to a shield device that allows a portion of the white light output of electromagnetic radiation to traverse through the window or lens device.

10. The lighting apparatus of claim 1 further comprising a thermal heat conducting material coupled to the surface mount substrate and configured to transfer thermal energy from the blue laser diode device and the infrared laser diode device to a heat sink.

11. The lighting apparatus of claim 1 wherein the infrared laser diode device is configured for a night vision application, a fog or smoke vision application, a ranging and sensing application, or a LiFi communication application.

12. The lighting apparatus of claim 1 further comprising an infrared imaging system configured to obtain images using reflected portions of the infrared output beam.

13. The lighting apparatus of claim 12 wherein the images are processed using at least one of an image processing, machine learning, or artificial intelligence analysis technique.

14. The lighting apparatus of claim 1 further comprising a sensing device operably coupled to the infrared laser diode device and configured to detect a reflection of the infrared output beam.

15. The lighting apparatus of claim 1 wherein the white light output of electromagnetic radiation is a point source.

16. The lighting apparatus of claim 1 further comprising a housing configured to partially enclose the blue laser diode device, the phosphor material, the surface mount substrate, and the infrared laser diode device.

17. The lighting apparatus of claim 1 wherein the lighting apparatus is a front lighting apparatus, and the mobile machine is an automobile, motorcycle, aircraft, drone, marine craft, or all-terrain vehicle.

18. The lighting apparatus of claim 1 wherein the white light output of electromagnetic radiation is characterized by an output of 750 Candela per square millimeter and greater; 1000 Candela per square millimeter and greater; 1500 Candela per square millimeter and greater; or 2000 Candela per square millimeter and greater.

* * * * *